Dec. 24, 1957 K. J. BRAUN 2,817,291
TRANSPOSING MECHANISM IN CARD CONTROLLED PRINTING MACHINES
Filed Feb. 19, 1954 12 Sheets-Sheet 1

INVENTOR.
KARL J. BRAUN
BY
ATTORNEY

INVENTOR.
KARL J. BRAUN
BY
ATTORNEY

Dec. 24, 1957    K. J. BRAUN    2,817,291
TRANSPOSING MECHANISM IN CARD CONTROLLED PRINTING MACHINES
Filed Feb. 19, 1954    12 Sheets-Sheet 5

INVENTOR
KARL J. BRAUN

Inventor
KARL J. BRAUN

Dec. 24, 1957 K. J. BRAUN 2,817,291
TRANSPOSING MECHANISM IN CARD CONTROLLED PRINTING MACHINES
Filed Feb. 19, 1954 12 Sheets-Sheet 8

Inventor
KARL J. BRAUN

By
J. C. Sterling
Attorney

Dec. 24, 1957        K. J. BRAUN        2,817,291
TRANSPOSING MECHANISM IN CARD CONTROLLED PRINTING MACHINES
Filed Feb. 19, 1954        12 Sheets-Sheet 9

INVENTOR
KARL J. BRAUN

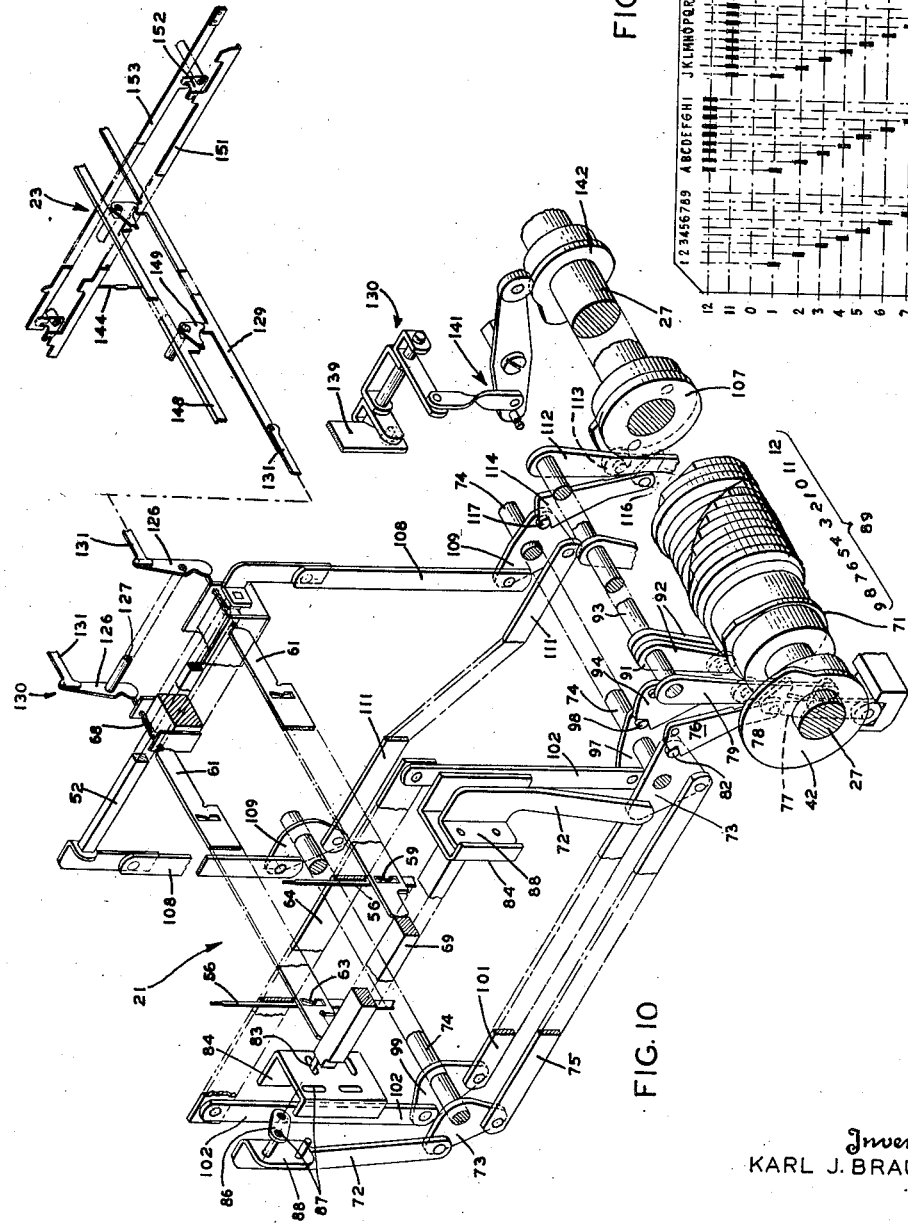

Dec. 24, 1957 K. J. BRAUN 2,817,291
TRANSPOSING MECHANISM IN CARD CONTROLLED PRINTING MACHINES
Filed Feb. 19, 1954 12 Sheets-Sheet 11

INVENTOR.
KARL J. BRAUN
BY
ATTORNEY

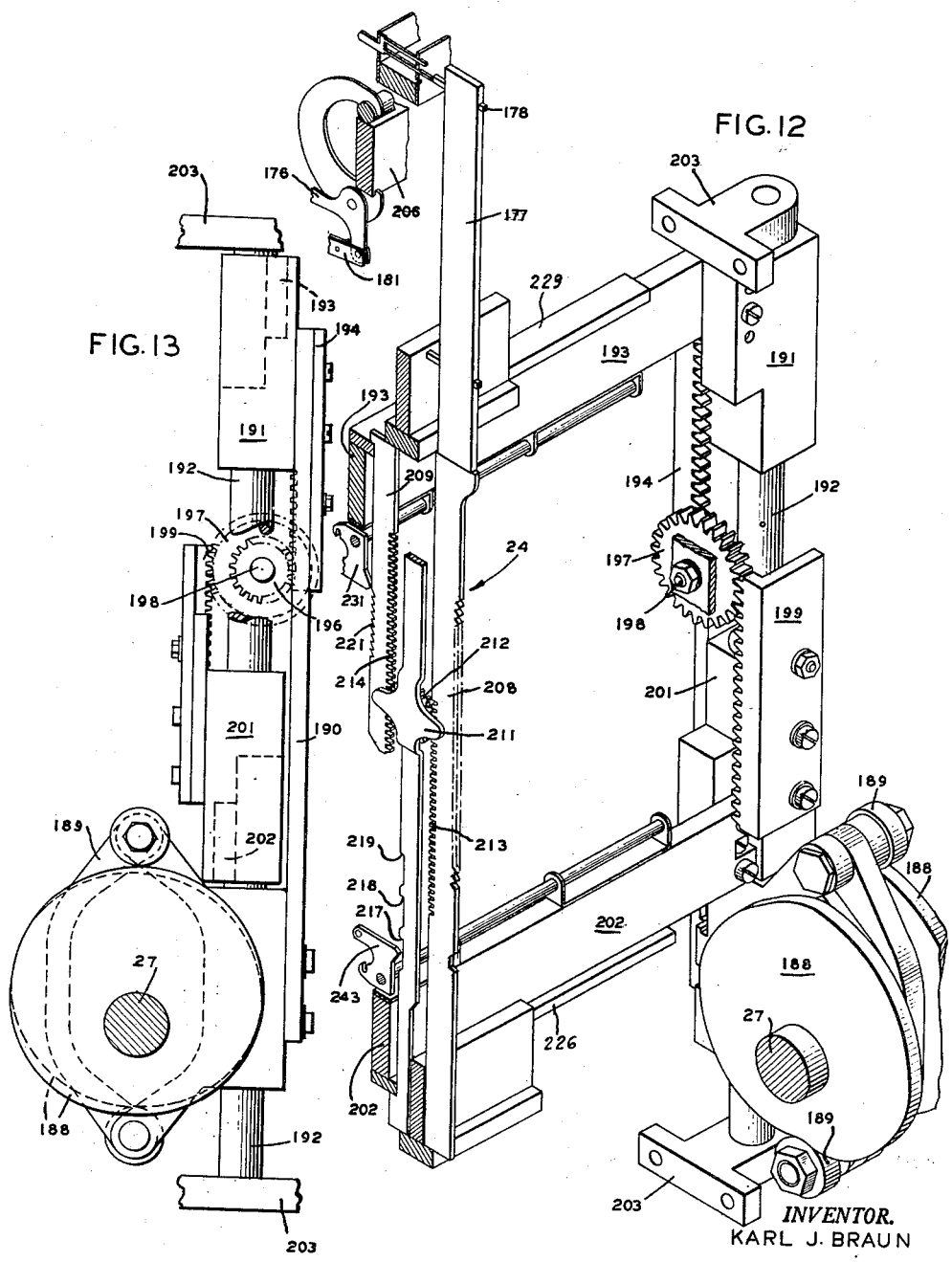

United States Patent Office 2,817,291
Patented Dec. 24, 1957

2,817,291

TRANSPOSING MECHANISM IN CARD CONTROLLED PRINTING MACHINES

Karl J. Braun, Glenbrook, Conn., assignor, by mesne assignments, to Sperry Rand Corporation, New York, N. Y., a corporation of Delaware Application February 19, 1954, Serial No. 411,460

19 Claims. (Cl. 101—93)

This invention relates to machines for sensing perforated statistical cards and for printing the data thereof on a record sheet.

In the use of machines of this type, wherein the data perforated in the cards is in code form, a decoding mechanism has been employed which in mechanical operation requires the setting of plates for the release of stops that limit the type positioning excursion of type carrying racks. It is an object of the present invention, in a mechanically operated machine, to dispense with the use of a decoding mechanism of the character referred to, and to decode the data sensed in the card during and by the movement of the type racks or carriers.

A further object of the invention is to sense a card punched with combinational code holes, and transpose the data so that it can be printed in any selected location on a record sheet without regard to where it appears on the card.

Other objects of the invention are to provide a transposing mechanism in which the sensing of different perforations in the same column of a card can be transferred as printing mechanism controlling pulses; to provide a transposing mechanism having plural parts for operation in transferring pulses from certain code perforations of a card simultaneously to a printing mechanism for decoding the data by controlling the movement of parts of said printing means, and to provide transposing mechanism in which the parts can be adjustably and selectively related in accordance with the work to be done.

Other objects and structural details of the invention will be apparent from the following description when read in connection with the accompanying drawings, wherein Fig. 1 is a plan view of the sensing section of the machine which may be combined with Fig. 2 to show the entire machine;

Fig. 10 is a view in perspective of part of the card sensing and pulse producing mechanism and operating parts thereof;

Fig. 12 is a fragmentary view in perspective of part of the printing mechanism;

Fig. 13 is a side view of the rack operating means as embodied in the printing mechanism;

Fig. 14 is a face view of a card showing the combinational code punchings thereof;

Figure 1:
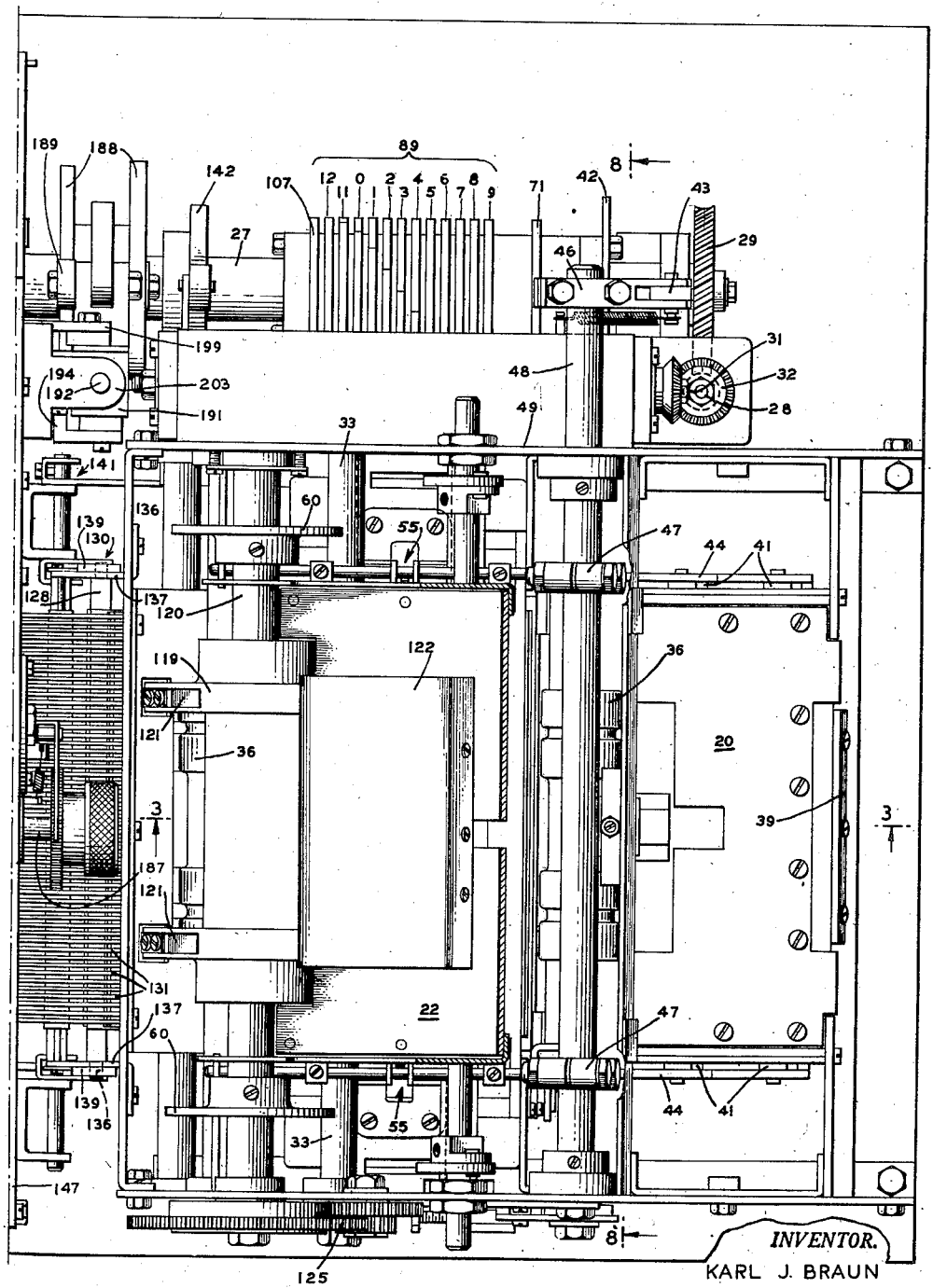
Figure 2:
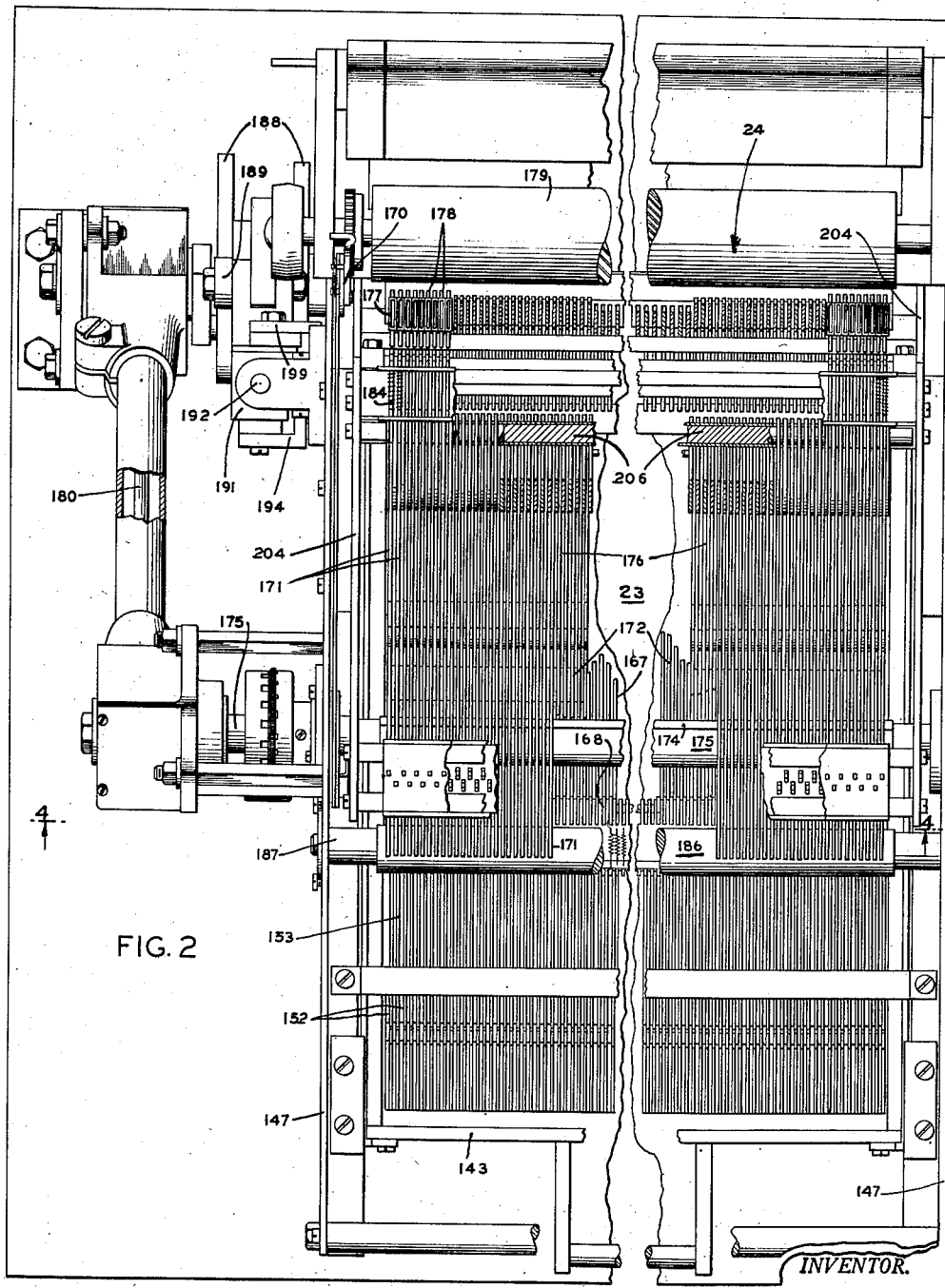
Fig. 2 is a plan view of the translating and printing section of the machine.

Referring to the drawing in detail, and in particular to Figs. 1, 2, 3, and 5, cards to be sensed are fed, one at a time, from a supply magazine 20 to a sensing mechanism 21 and then to a card stacking table 22 above said mechanism. The character designations sensed simultaneously in the entire card are projected as individual impulses through a transposing and translating mechanism combination 23 to be printed by the type of a printing mechanism 24.

The cards employed, by way of example, have eighty vertical columns of twelve data index positions per column (Fig. 13) arranged from top to bottom of the card in horizontal rows identified as 12, 11, 0, 1, 2, 3, 4, 5, 6, 7, 8 and 9 positions, which may be perforated individually, or in combination, with oblong holes to designate data numerals and characters. The holes 1 to 9, inclusive, will be referred to as "numeral group perforations" while the holes 12, 11, and 0 will be referred to as "alphabet group perforations." The latter when combined with the former are employed to designate the letters of the alphabet or other special characters and while holes have been referred to, it is understood that any designating means may be employed that can be sensed either by pins, or brushes, or photoelectric means. The pins of the mechanical sensing mechanism employed correspond to this arrangement of data index positions in the card, and the pins of each column, that have sensed holes in the card, are drawn down in row by row order to produce a pulse action resulting in the printing of the data sensed.

The machine is operated through a main drive shaft 27 deriving its motion from a vertical power shaft 28 driven from any suitable source of power and connected to the shaft 27 through a worm and worm wheel combination 29. The shaft 28 also drives a feed shaft 31 through miter gears 32, the shaft 31 driving upper and lower feed roll mandrels 33 and 34, respectively, through a train of parts including helical gears 30 and 35 and spur gears 40. The mandrels 33 and 34 (Figs. 3 and 5) carry upper and lower feed rolls 36 and 37, respectively, to pass a card from the magazine 20 to a card chamber 38 forming part of the sensing mechanism 21 and to pass the card, after it is sensed, from the chamber to the card stacking table 22. The cards are fed out of the supply magazine 20 one at a time by a picker 39, whose parallel motion linkage 41 is actuated cyclically from a card feed cam 42 on shaft 27 through links 43 and 44 connected, respectively, by rock arms 46 and 47 to a rock shaft 48 journaled in a side wall of the housing 49 of the machine. The mandrels 34 may be journaled in bearings 51 which are pivotally adjustable, in well known manner, to vary the pressure between the upper and lower feed rolls.

Figure 3:
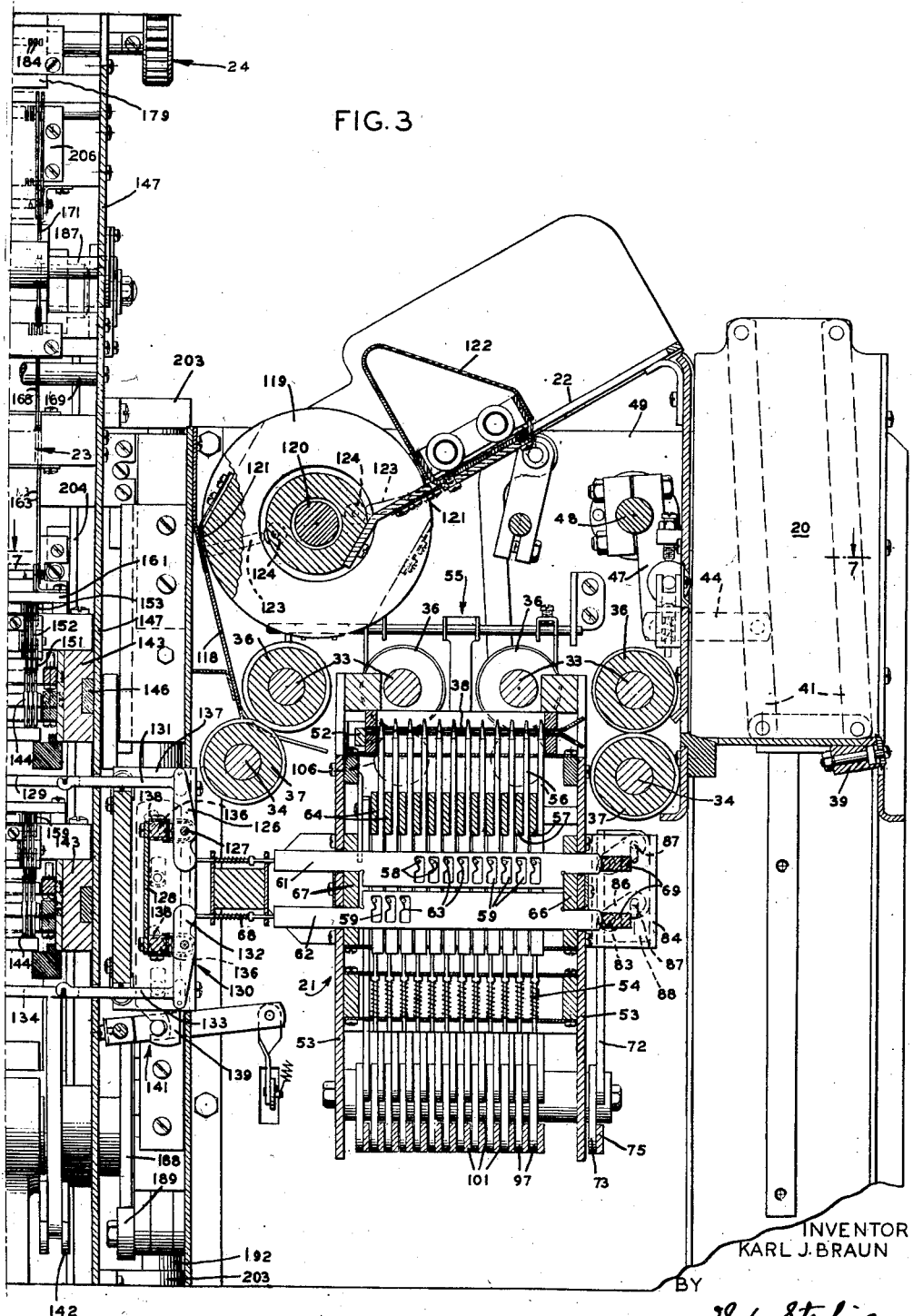
Fig. 3 is a section in vertical elevation taken on the line 3—3 of Fig. 1 and forms with Fig. 4 a section longitudinally of the machine.
Figure 8:
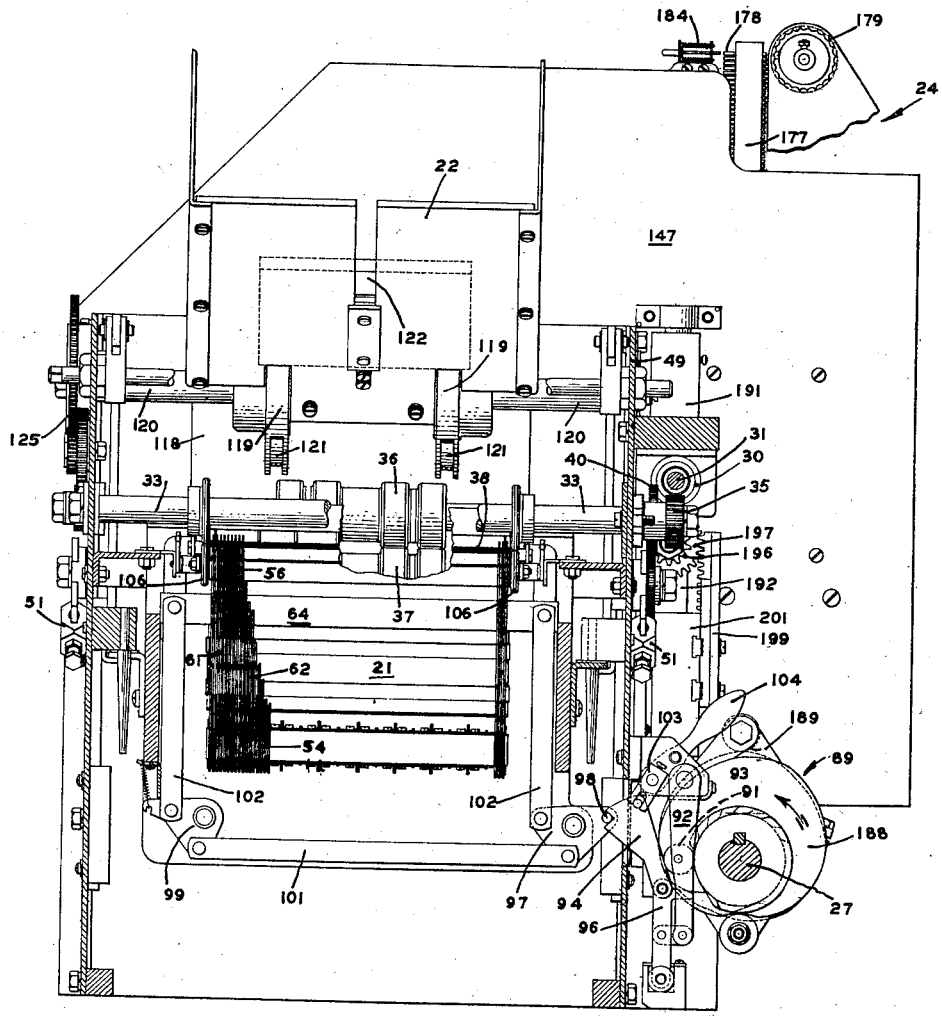
Fig. 8 is a vertical section on the line 8—8 of Fig. 1 showing the sensing mechanism and operating parts associated therewith.

A card fed out of the magazine 20 is passed by upper and lower feed rolls 36 and 37 into and out of the card chamber 38, and properly aligned by a conventional centering means 55 from cams 60 to abut a movable card stop 52, where it is held to be analyzed by the sensing mechanism 21. The latter is suitably supported as a unit between the side walls of the housing and includes side plates 53 between which are mounted spring urged pressure pins 54 for yieldably urging sensing pins 56 to raised position to engage a card to be sensed and pass through the perforations thereof. Each sensing pin 56 is cut to form a shoulder 57 and, as seen in Fig. 3, has a stud 58 projecting toward the observer and into a window 59 of a group of windows formed in each of two superposed pulsing latch slides 61 and 62. Each window is shaped to provide a camming lobe 63 whose underside provides a projection for latching the stud to hold the associated sensing pin in its lower or retracted position. The pins in each column of sensing pins correspond to the data index positions of the cards and the windows 59 of the upper slide 61 looking from right to left in Fig. 3 correspond to data index positions 9, 8, 7, 6, 5, 4, 3, 2, and 1, while the windows of the lower slide 62, in the same order, correspond to the data index positions 0, 11, and 12. In the shouldered portion of the pins, of each row of pins 56, is disposed a restoring bar 64 for the purpose of pulling down or restoring the pins to their lower position, where they are held by the latching or pulsing slides 61 and 62. The latter are yieldably urged toward the right against a guide plate 66 by a spring urged pin bank 68. The opposite ends of the slides are reduced in width and are mounted for movement in said guide plate 66 and in an opposite like plate 67. The slides are actuated momentarily in one direction by dual release strips 69 against the resistance of the pin bank 68 to unlatch the studs 58 and let the pins 56 be raised by the pressure pins 54 to sense the entire card at once. Those pins finding holes in the card will position the studs above the lobes of the slides 61 and 62. The release strips or bars 69 are actuated from a release cam 71 on shaft 27 (Figs. 8, 10, and 11) through a parallel motion mechanism including vertical links 72, plate levers 73 joined by tie links 75 pivoted on cross rods 74 mounted in the side plates 53, and a toggle mechanism. The latter includes a pair of toggle links 76 and 77 which are moved in alignment direction by the action of a cam roller 78 on a dependent link 79 engaging the release cam 71. As the links 76 and 77 tend to align, the upward movement of link 76 pushes on a pin 82 of plate lever 73 and the counterclockwise motion of the latter pulls down on the links 72. The end of each strip 69 (Fig. 11) has a pin-in-a-slot connection 83 with a bracket 84 and is also connected to a link 86 which has a pin-in-a-slot connection 87 with the bracket 84, the pin of said connection 87 being pivoted in the flanged end 88 of the link 72. The slot of connection 83 is horizontal while the slot of connection 87 is vertical, and a downward pull on the links 72 will move the links 86 to horizontal position and, through the strips 69, move the slides 61 and 62 endwise to release the pins 56.

In order to provide pulsing actions, the pins 56 are drawn down row by row in combination and in succession and the studs 58 of those pins that have sensed holes in the card will, in passing their respective lobes, cam the slides to the left in Fig. 3. The retraction of the pins 56 is accomplished by the restoring bars 64 which pull the elevated pins down successively row by row so that the slides 61 and 62 may be actuated individually or in combination with each other. The restoring movement of each bar 64 is carried out by one of a group of twelve cams 89 designated as 12, 11, 0, 1, 2, 3, 4, 5, 6, 7, 8, and 9 corresponding to the columnar order of the data index positions of the card. Each cam operates a roller 91 (Figs. 8 and 10) connected to a cam roller link 92 hung from a rod 93 and operable to align toggle links 94 and 96 to rock a plate lever 97 by engaging a pin 98 thereon.

The motion of the plate lever 97 is transferred to a similar plate lever 99 through a tie link 101 to pull down on the vertical links 102 which depend from the ends of the restoring bars 64. Any one or all of the toggle connections between the cams 89 and the restoring bars 64 can be disabled through operation of a forked dog 103 by a finger piece 104 to move the associated toggle link 94 away from the pin 98 on lever 97.

After the card has been sensed, the stop 52 is lowered to open the exit end of the card chamber 38 and the card, by the combined action of the feed rolls 36 and their associated skid rolls 106, is passed to the card stacking table 22 through the innermost feed rolls 36 and 37. The card stop 52 is opened and closed cyclically by a cam 107 on shaft 27 (Fig. 10) which cam operates vertical parallel links 108 through plate levers 109 and a connecting link 111 by a toggle combination including a depending link 112 whose roller 113 engages the cam 107. The toggle also includes the toggle links 114 and 116 which are aligned to push on a pin 117 on the adjacent plate lever 109 to open the card stop. The card stacker (Figs. 3 and 8) includes an apron plate 118 which guides the cards against the flanged periphery of a stacking cylinder 119 to be gripped by spring clamps 121 and deposited on edge on the table 22, the stacked order of the cards being maintained by the gravity weight 122 mounted for rolling movement on the inclined table 22. The cylinder rotates with shaft 120, which at one end is driven by a gear train 125 from one of the skid roll shafts 33. The card clamps 121 are operated by plungers 123 arranged radially in the cylinder to ride over cam rollers 124 in timed relation with the feed of a card to the cylinder, which feed is coordinated with the peripheral speed of the cylinder 119.

Figure 4:
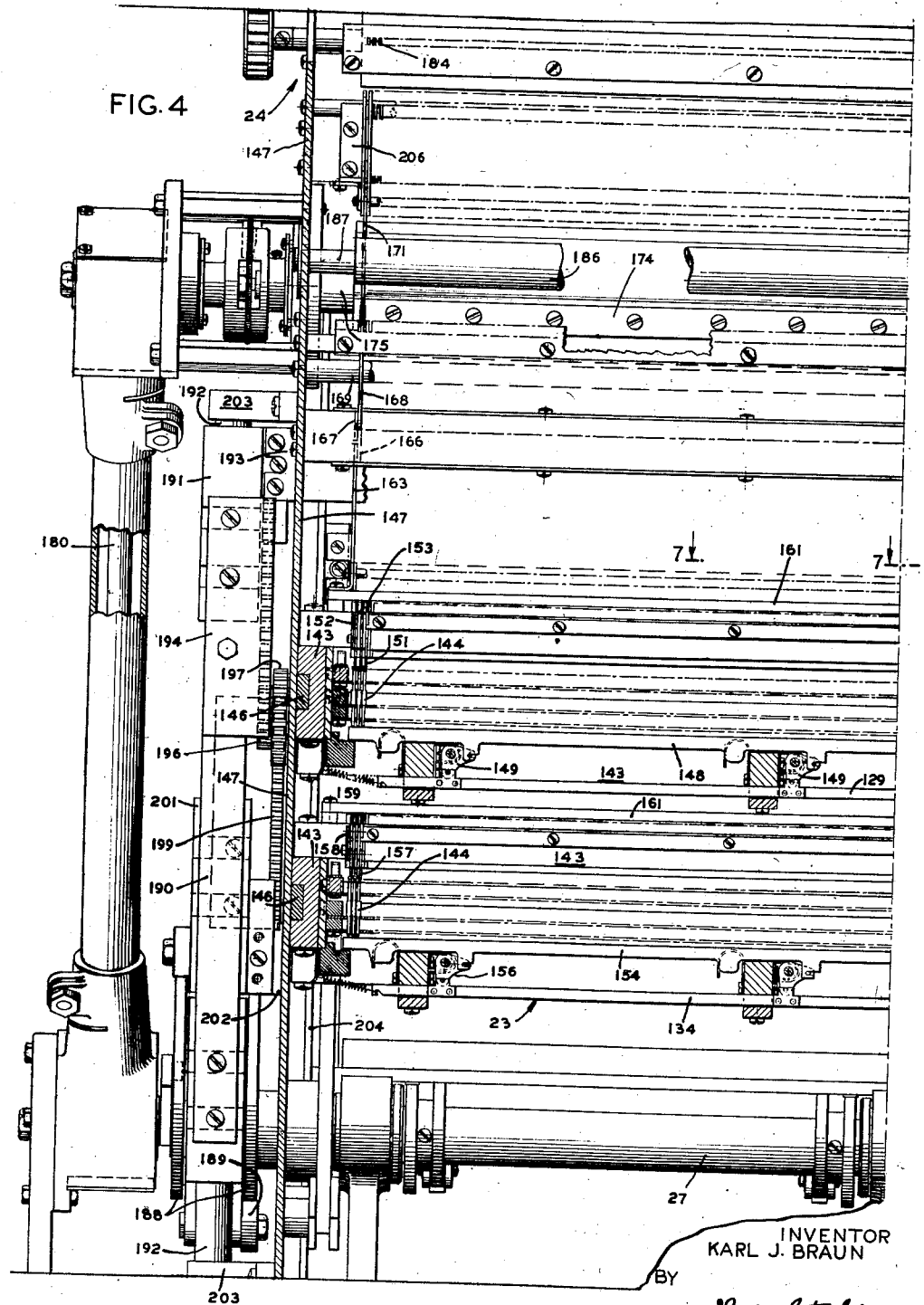
Fig. 4 is a section in vertical elevation taken on the line 4—4 of Fig. 2.
Figure 5:
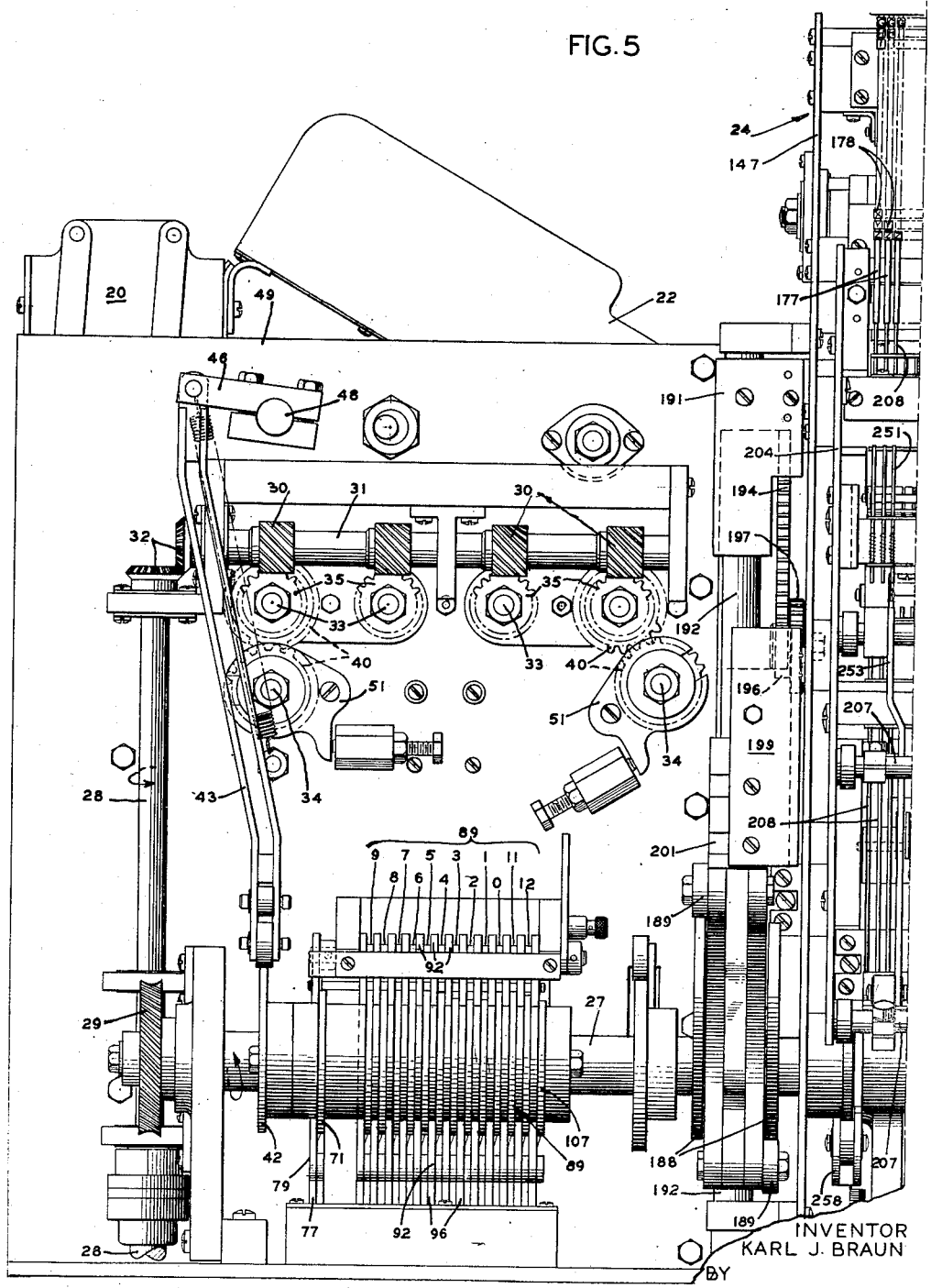
Fig. 5 is a view in elevation looking at the right side of the sensing section of the machine and may be combined with Fig. 6 to show the entire machine.
Figure 6:
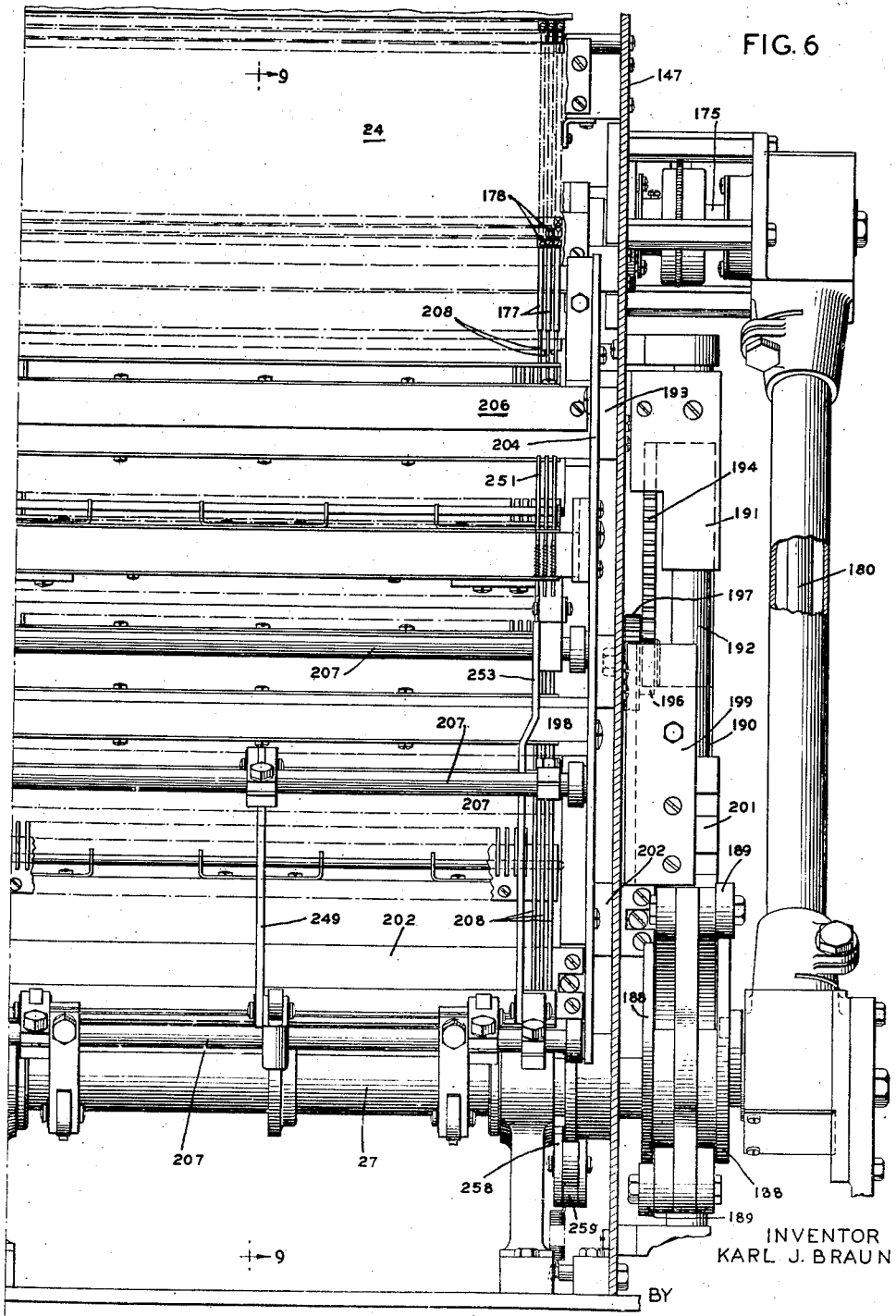
Fig. 6 is a view in elevation looking toward the rear of the printing section of the machine, the platen being removed to show the type carriers.
Figure 7:
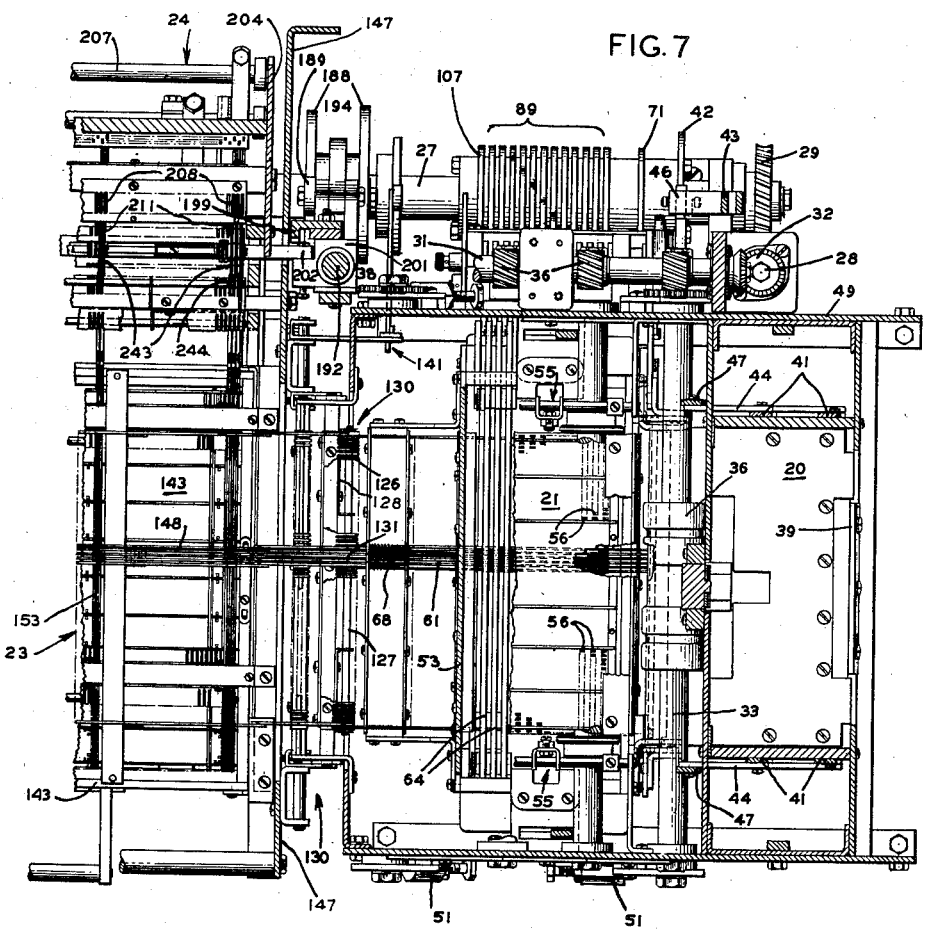
Fig. 7 is a section in plan taken substantially on the line 7—7 of Fig. 3 and also on the same plane in a part of Fig. 4.
Figure 17:
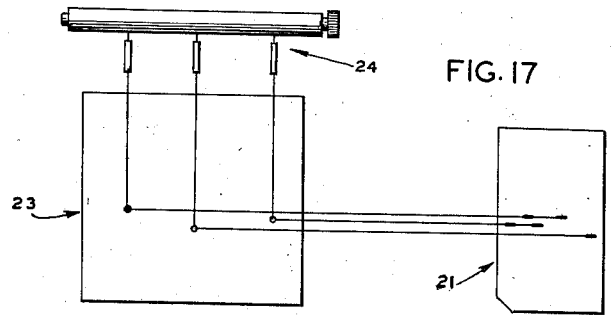
Fig. 17 is a diagrammatic view showing the operation of the transposing mechanism.

The mechanism for transferring the pulsing actions of the upper and lower slides 61 and 62, respectively, is indicated generally as at 23 and referred to as a transposing mechanism in that it may be used to transpose or rearrange the position of the matter to be printed on a record sheet about a platen with respect to the position of the matter on the punched card, and is used to so control the operation of the printing mechanism that translation of the coded perforations in the card is accomplished without the necessity of using a complicated permutation type decoding means. Each upper slide 61, when it is moved to the left (Fig. 3) acts through an upper aligned pin in the pin bank 68 of a disabling mechanism 130 to swing a lever 126 about its pivot 127 in an adjustable holder 128 to pull a slide bar 129, through a hinge link 131, to the right in Fig. 4. In the card used as an example herein, the "1" to "9" data positions are used for the corresponding numerals while, for the alphabet, the data positions "12," "11" and "0" are combined with the data positions "1" to "9." For convenience, therefore, the lower slides 62 which are moved by the pins of the "12," "11" and "0" rows of data index positions will be referred to as the alphabet or combination slides, along with the mechanism actuated by movement thereof which includes, for each slide, a lower aligned pin in the pin bank 68 for swinging a lever 132, when the slide moves to the left in Fig. 3. The lever 132 is pivoted in the adjustable holder 128 and through a hinge link 133 pulls a lower slide bar 134, in Fig. 4, to the right. The transposing and translating mechanism is to be operated only when the slides 61 and/or 62 are pulse actuated by the downward or restoring action of the bars 64 on the pins 56 that have sensed holes in the card. Early in the cycle of machine operation the slides 61 and 62 are momentarily given a movement to the left in Fig. 3 to release all of the pins 56 for sensing the whole card at once. In order to prevent any transmission of this latter or "sensing" movement of the slides to the transposing mechanism, the adjustable holder 128 of the disabling means 130 is moved to the left in Fig. 3 to position the free tail ends of the levers 126 and 132 out of range of movement of the pins of the bank 68. This movement is carried out by the holder 128 whose pins 136, extending through horizontal slots in a bracket 137, also extend into obliquely disposed slots 138 in a vertically movable actuator 139. When the latter is pulled down through suitable lever linkage 141, from a cam 142 on shaft 27 (Fig. 10) the holder 128 moves to space the tail ends of the levers 126 and 132 from the pins of bank 68 so that the "sensing" movement of the slides 61 and 62 is without effect on the transposing mechanism.

Figure 9:
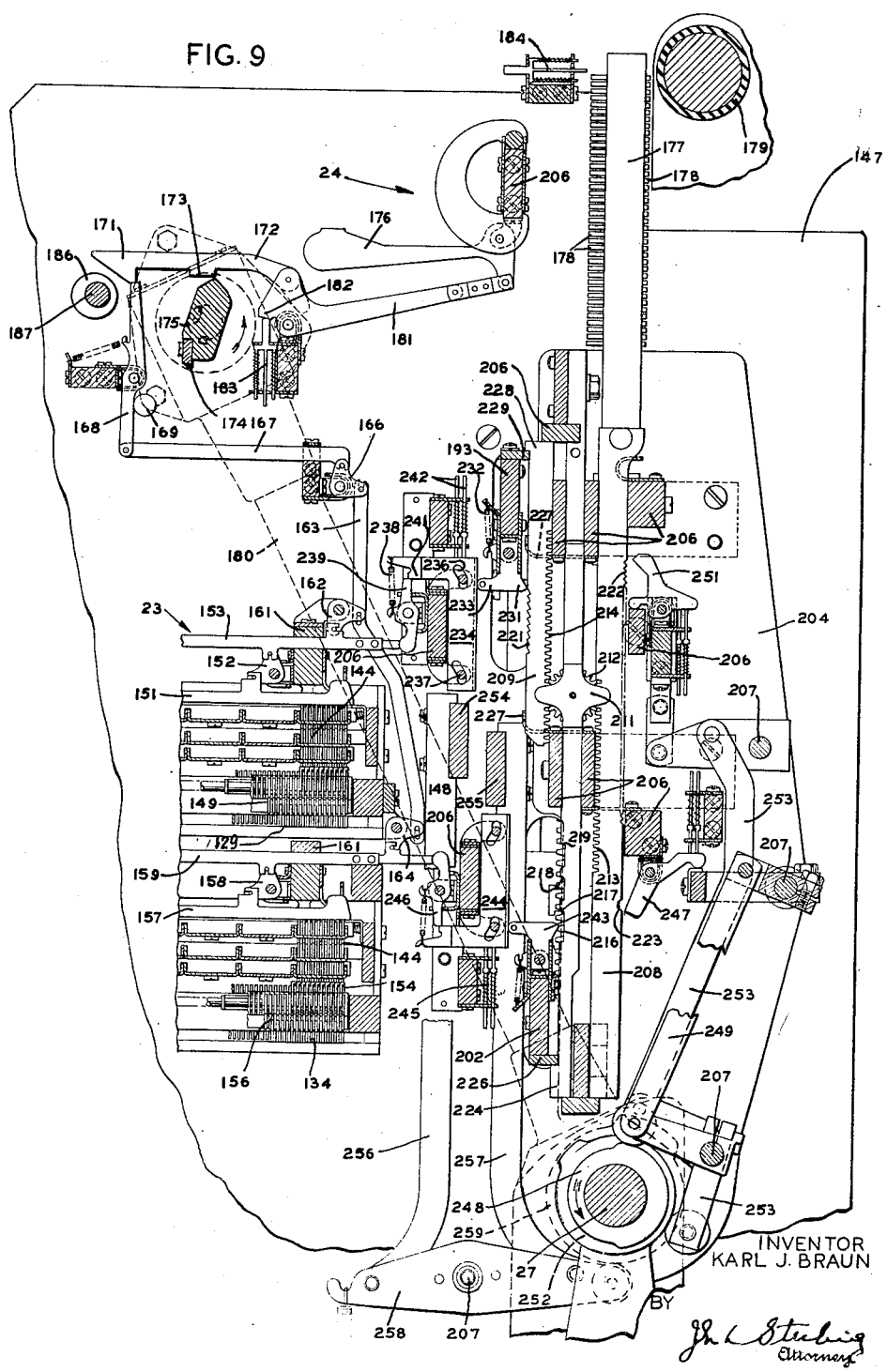
Fig. 9 is a vertical section on the line 9—9 of Fig. 6 showing the printing mechanism and its associated parts.

The slide bars 129 (Figs. 3, 4, 9, and 10) are the lowermost of an upper group of transposing mechanisms operated by the slides 61, while the slide bars 134 are the lowermost of a lower group of transposing mechanisms operated by the slides 62. Each group includes a tray 143 in which pins 144 are removably mounted for selected spatial arrangement when the tray is slid out of its tray compartment formed by suitable supporting strips 146 mounted on the side walls 147 of the transposing unit 23. For transposing flexibility there are, for example, at least sixty-four hundred pin holes in each of the trays in a machine using an eighty column card. When the slide bars 129 of the upper set of pulse transferring means are moved longitudinally, by the pulse action of the slides 61, they raise lift bars 148 through the action of bellcranks 149, and the bars 148, through the pins 144, elevate upper lift bars 151 arranged in intersecting rectangular relation to the lower slide and lift bars 129 and 148, respectively. The upper lift bars 151 (as best seen in Fig. 9) through bellcranks 152 move upper slide bars 153 endwise to completely or partly condition and control the printing mechanism 24. The upper slide and lift bars 153, 151 as pairs, intersect the lower slide and lift bars 129, 148 as pairs, at the points where a pin can be placed in the tray so that it is possible to sense the data perforations, for example, in the tenth to twentieth columns of the card, and to print the data in the fiftieth to sixtieth columns of the record.

The lower set of pulse transferring means including slide and lift bars are duplicates of those in the upper set. When the slides 62 are pulse actuated by the restored action of any one of the pins "12," "11" or "0" that have sensed a hole at the respective position in the card, the lower slide bars 134 are moved endwise, through the pins of the bank 68, to raise lower lift bars 154 through connecting bellcranks 156. Through the pins 144 of the lower tray 143 the upward movement of any of the lower lift bars 154 is transmitted to raise rectangularly disposed upper lift bars 157 which in turn, through bellcranks 158, shift upper slide bars 159 longitudinally to coact with the upper group slide bars 153 to condition and control the printing mechanism. The various slide and lift bars of both upper and lower groups of mechanism are mounted on cross members 161 suitably supported in the frame of the machine. Each group of mechanisms may act independently of the other, as in the transposing and/or translation of the movements of slide 61, or may act in unison when both slides 61 and 62 are simultaneously given impulse movements. When two holes are used in combination in the same column of a card, such as "12" and "5" for letter "E," as an example, the pin 144 in the lower tray will be directly beneath the pin 144 in the upper tray and as will be explained hereinafter, the pulsing action conveyed by said pins will ocur at different times to control the operation of the printing mechanism.

The right hand ends of the upper slide bars 153 of the upper group (Fig. 9) controlled by the impulse movements of sensing unit slide 61, are each connected by a bellcrank 162 to vertical links 163 which are also connected through bellcranks 164 with the ends of the upper slide bars 159 of the lower group of mechanisms.

The links 163 have a pin-in-a-slot connection with the bellcranks 162 and 164 to be raised by either or both slide bars 153 and 159. Each link 163 is connected by a bellcrank 166 and a short link 167 to the lower end of a detent lever 168 which is spring urged against a limit pin 169 so that its upper free end will normally underlie the nose end 171 of a pull arm 172. A mechanism of this type is disclosed in Patent 2,658,447. An upward movement of link 163 will swing the lever 168 clockwise and cause the pull arm 172 to drop down and place a lip 173, on the underside thereof, in the path of a rotating tappet 174. The tappet is common to all of the pull arms 172, there being one of these pull arms for each hammer 176 of each type carrier 177 in which two pieces 178 are mounted for projection against the face of a platen 179. The platen is automatically operated for line spacing by any suitable mechanism 170. The tappet 174 is secured to a tappet shaft 175, of such cross-sectional configuration as to allow for the operational movements of the pull arms 172 without interference. The shaft 175 is driven from the main shaft 27 through countershafts 180 and suitable miter gearing drive means. Each hammer 176 is connected to its respective pull arm 172 by a pitman 181 having a heel 182 which rests on the spring pin of a pin bank 183. The hammers 176 are swung against the resistance of the pins of bank 183 to project the type against the platen through a similar bank 184 of pins. The force with which the hammers operate the type may be controlled by an eccentric cam 186 mounted on a manually adjustable shaft 187 and underlying the bevelled nose ends 171 of the pull arms 172. Adjustment of the cam limits the extent of pull imparted to the arms 172 by the tappet 174 by controlling the amount of drop permitted the arms. The cam 186 automatically restores the nose ends of the arms to a position atop the detent levers 168 as the latter snap back to inoperative position when the arms 172 are actuated.

The printing mechanism, indicated generally as at 24 (Figs. 4, 9 and 12) includes the shaft 27 which extends through the side walls 147 of the frame and carries, adjacent the exterior of each wall, a pair of cams 188 which coact to operate followers 189 in positive reciprocating movement on vertical guide rods 192 which are supported in brackets 203 on said side walls. The followers 189 support vertical elevator strips 190 to the upper ends of each of which is secured a rack 194 and an upper slide block 191. The slide blocks support a cross bar 193 and the rack 194 has driving mesh with a pinion 196 to which is fixed a gear 197. Each gear and its pinion have a common stud mounting 198 on each side wall so that when a rack 194 operates the pinion, the gear 197 which meshes with a rack 199 fixed to a lower block 201, will slide the latter on the guide rod 192. The lower blocks 201 support a lower cross bar 202 to be later referred to. Upon operation of the cams 188, the racks 199 will move relatively faster than the racks 194 due to the difference in the sizes of the gears and pinions, with the result that the cross bar 193 will move a relatively shorter distance than will the cross bar 202. The cross bar 202 will move one and nine-tenths inches while the cross bar 193 is moving one and two-tenths inches or in a ratio of approximately five to three. This relative difference in the movement of the cross bars and the parts associated therewith is a factor in the translatorial action of the parts.

The printing racks and operating means therefor (Figs. 9 and 15) are mounted in a frame including side panels 204 secured to the side walls 147 in any suitable manner, and arranged to support therebetween guide and support bars 206 and rods 207 for mounting the various parts of the mechanism. As seen in Fig. 9, the type carriers 177 are secured to type racks 208 which are arranged, with auxiliary racks 209, in vertical flanking relation to an actuator 211 carrying a gear 212 for diametrically opposite meshing engagement with teeth 213 and 214 formed on the opposing edges of the type carrier racks 208 and the auxiliary racks 209, respectively. One edge of each actuator 211 is shaped to provide undercut portions 216 which form three vertically spaced shoulders 217, 218, and 219. One edge of each auxiliary rack 209 is serrated to provide saw-shaped teeth 221 and one edge of each type rack 208 is provided with V-shaped detent teeth 222 and a detent seat 223. The type racks 208 and the actuators 211 are guided between and rest on the support bars 206, the actuators each having a foot portion 224 which underlies an actuator restoring strip 226 extending along the bottom of the lower cross bar 202. The auxiliary racks 209 as well as the actuators 211 are guided in comb plates 227 and the auxiliary racks are supported by engagement of a lip 228 thereon with a rack restoring strip 229 secured to the top edge of the cross bar 193.

Each auxiliary rack 209 can be lowered by an associated dog 231 moving downwardly with the upper cross bar 193 to which it is pivoted. The dog is normally urged out of engagement with the rack by a spring 232 which maintains a tail 233 on the dog 231 in contact with the turned over edge of an upper mesh plate 234. The latter has camming slots 236 in which pins 237 mount the plate on suitable brackets for vertical and lateral movement when the plate is pulled down by a spring 238 after release by a supporting trigger 239. The latter pivoted on a bar 206, has its depending end in register with the end of the upper slide bar 153 of the upper group of transposing mechanisms, and has its upper end underlying a lip 241 on said mesh plate 234, the latter of which is yieldably urged downwardly also by the spring pins of a bank 242. When the bar 153 has a pulse movement to the right in Fig. 9, it trips the trigger 239 and the mesh plate 234 is pushed down and cammed to the right to move its dog 231 into mesh with one of the teeth 221 of the rack 209 designated "1" to "9." The dog being carried down by cross bar 193 will push the auxiliary rack 209 down a predetermined distance, as defined by the sequential order of the impulse given the bar 153 by the upper pulsing slide 61 of the card sensing mechanism 21 (Fig. 3). The downward movement of a rack 209 will elevate an associated type rack 208, through the gear 212, at the same rate at which the rack 209 descends. A faster rate of rise of the rack 208 is provided by upward movement of the actuator 211 which is elevated by a set of parts that are in mirror reverse position to the operating parts described for the rack 209 and include; a dog 243 for selective engagement with any one of the shoulders 217, 218, or 219 of the actuator 208 designated "0," "11," and "12," respectively; a lower meshing plate 244; a spring pin bank 245 and a trigger 246 controlling the camming operation of the plate 244 as the result of an impulse movement of the upper slide bar 159 of the lower group of transposing mechanisms. The dog 243 is pivoted to the lower cross bar 202, and when it engages one of the shoulders 217, 218, or 219 will elevate the associated rack 208 at variable speed depending upon whether the rack 209 is moving down or is stationary. When each printing rack 208 is in the normal lower or starting position it may be held against displacement by a detent 247 engaging a detent seat 223, of the rack, under control of a cam 248 on shaft 27 through a rock arm assembly 249. When any printing rack has been raised to its printing position it may be held by a detent pawl 251 engaging the teeth 222 under control of a cam 252 on shaft 27 through a rock arm assembly 253.

After printing has occurred, the mesh plates 234 and 244 are returned to latched position, as shown in Fig. 9, by the rising and lowering movement of restoring bars 254 and 255, respectively. The bar 254 extends beneath all of the mesh plates 234 and is supported at its ends in pitmans 256. The bar 255 extends across the top of all of the mesh plates 244 and is supported at its ends in pitmans 257. The pitmans 256 and 257 are pivoted to the opposite ends of levers 258 which are fulcrumed on a support rod 207 and actuated by cams 259 on shaft 27.

In Fig. 14 a record card is shown in which single columnar perforations are representative of the numerals one to nine, and double columnar perforations are representative of the letters of the alphabet. The double perforations are located in the horizontal rows 12, 11, and 0, and in the horizontal rows 1 to 9, while the single perforations are located only in the rows 1 to 9. This is a well known code arrangement and is employed to conveniently illustrate the operation of the machine. At a predetermined time in the cycle of operation, the restoring bars 64 (Fig. 3) rise and permit all of the sensing pins to sense the entire card at once. The pins finding holes cause their studs to be positioned above the cam noses or lobes 63 of pulsing or latch slides 61 and 62. The bars 64 are then drawn down singly and in pairs by operation of the cams 89 in (9 and 0) 8, 7, (6 and 11) 5, 4, (3 and 12) 2, 1 in this order. Any upper slide 61 is pulsed by the withdrawal of pins that have sensed a hole in the 1 to 9 rows. Any lower slide 62 is pulsed by the withdrawal of pins that have sensed a hole in the 12, 11, or 0 rows.

Figures 11, 15, 16:
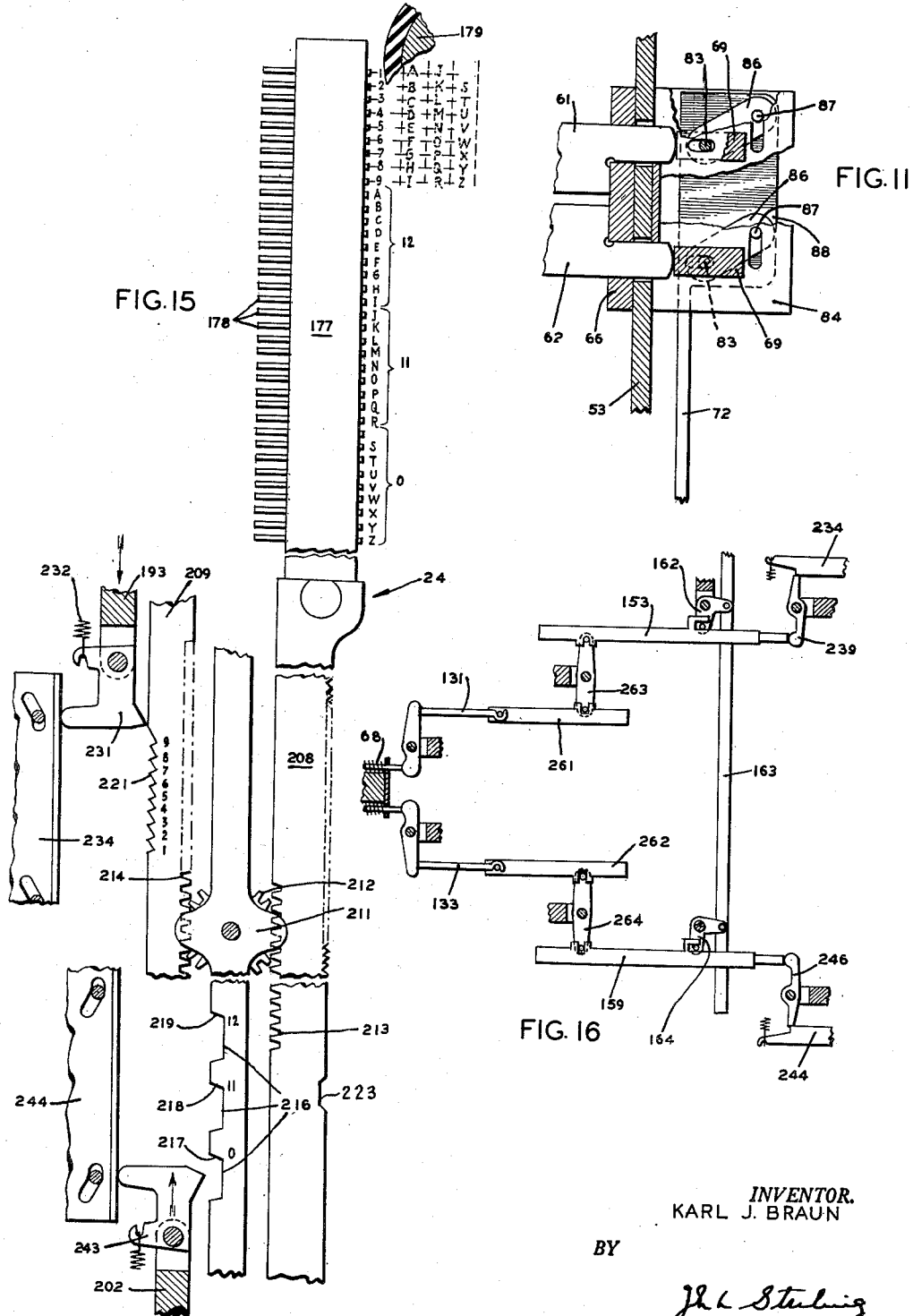
Fig. 11 is an enlarged fragmentary view of the sensing pin releasing means.
Fig. 15 is a side view of a type rack showing diagrammatically the positioning of the characters thereof.
Fig. 16 is a fragmentary showing of a modified form of the invention.

The type 178 of the print rack are arranged, as shown diagrammatically in Fig. 15, with nine numerals in the upper or "one to nine" zone; nine alphabet characters A to I, inclusive, in the "12" zone; nine alphabet characters J to R, inclusive, in the "11" zone and eight alphabet characters S to Z, inclusive, in the "0" zone. At its normal lowered position, the top type piece will be one increment of movement of the type rack, as defined by the space between adjacent teeth 221 of the rack 209, from the printing position. Asuming that a perforation is sensed in row "3" of the third card column, which is the single code hole for the numeral three, the dog 231, during its downward movement will be projected into the tooth "3" of the rack 209 when a slide bar 153 is pulsed by the slide 61, that corresponds to the third column of the card, when the restoring bar 64 corresponding to row "3" of the card is pulled down by the "3" cam. The rack 209 moves down three increments and through gear 212 moves the type carrier 177 up three increments to bring the numeral three type to printing position in alignment with the platen. In all card columns where a perforation denoting a numeral is sensed, the various type racks will be moved upwardly an amount corresponding to the downward movement of the racks 209.

For the purpose of explaining the decoding of the combinational perforations, designating letters of the alphabet, the three zones of alphabet type characters identified as "12," "11," and "0" in Fig. 15 correspond in extent to the nine increment length of the numeral zone 1 to 9. Assuming that the perforations in rows twelve and five of the card are sensed, the cam 89 designated "5" will cause a slide bar 153 to be pulsed to engage the downwardly moving dog 231 with the notch "5" of a rack 209 and move the latter down five increments and the type rack up five increments. While the rack 209 is moving down, however, the cam 89 designated "12" causes a pulse in a slide bar 159 through pulsing action of a lower slide 62, and a dog 243 is moved into the cut out below the shoulder indicated as "12" and pushes upwardly thereon to raise the actuator 211. The upward movement of the pivot of gear 212 combined with the rotation thereof by rack 209 multiplies the upward movement of the rack 208 and the type carrier 177 to such an extent that the "12" zone of the alphabet type is moved up to the position normally occupied by the numeral types plus the five increments of movement given by the dog 231 with the result that the letter "E" is positioned at the printing point by the synergetic action of the parts.

When a perforation in the "11" position is sensed the dog 243 moves the rack 208 to bring any letter in the "11" zone of the type carrier to printing position as determined by the extent of movement of the rack 209 under influence of the dog 231. In the order of operation of cams 89, the "9" and "0" cams will cause a maximum movement of the type carriers if, in any column of the card, perforations in the "9" and "0" positions are sensed which represent the letter "Z." If only the perforations "12" or "11" or "0" in a card were sensed, the type carrier would position the alphabet zones in the respective positions shown in dotted lines in Fig. 15. It is evident that any further increment of movement given the type carrier by the sensing of a one to nine perforation will position the corresponding type of any of the three zone groups "12" or "11" or "0" at the printing position.

Assume the letter "S," whose perforation representations are "0" and "2," to have been sensed. The first pulse will be "0" and the dog 243 engaging the shoulder "0" of actuator 211 will cause the type carrier to move up to position the alphabet zone "0" as shown in Fig. 15, or one increment short of the printing point. In this particular zone the number "1" position perforation is reserved for a special character and thus is shown as a blank. The dog 231 in the meantime has moved down and when the cam "2" causes pulsing of a slide 153, the dog 231 is pushed over to engage in the "2" notch of the rack 209 with the result that the type carrier moves up two additional increments to bring the "S" type up to printing position. Basically, the function of the shoulders "0," "11," and "12" is to position each alphabet zone as illustrated and the function of the notches "1" to "9" of the rack 209 is to add to the movement of the type carrier one to nine additional increments. However, these movements are interfluent and the combinational movements of the type carrier caused by the varied movements of the rack 209 and the actuator 211 need not be further analyzed. The printing of a zero may be accomplished by using the alphabet letter "0," and in the absence of a hole in any column of a card no pulse will reach the printing mechanism and a space will be left on the sheet being printed.

It is evident that the position of the type can be controlled by variations in the spacings of the shoulders "0," "11," and "12" and in the spacings of the notches "1" to "9." In effect the action of the dogs, racks, and actuators combine to provide a device for decoding the information in a card, that has been perforated therein in accordance with a code system, while the printing elements are being positioned so that the time, heretofore consumed in first decoding and then setting printing racks in accordance with such decoding, is saved.

It is possible as shown in Fig. 16 to dispense with the use of the transposing mechanism 23 by attaching to the free end of each of the hinge links 131 and 133 an interponent link 261 and 262, respectively, which through rocker levers 263 and 264, respectively, will supply a pulse directly to the upper and lower slide bars 153 and 159, respectively.

The invention is not to be restricted to the precise details of construction shown since various changes and modifications therein may be made without departing from the scope of the invention or sacrificing the advantages derived from its use.

What I claim as new, and desire to secure by Letters Patent, is:

1. In a record controlled machine having record sensing means including row forming columns of yieldably urged pins, latching means for holding the pins of each column in lowered position, means for cyclically moving said latching means to release the pins for simultaneously sensing all of the code perforations in a record; restoring for means common to the pins of each row for retracting the pins in row by row order, said latching means being common to the pins of each column and operable by the retractile movement of pins that have sensed perforations in different rows of the record to provide a pulsing movement, and means controlled by pulsing movement of said latching means for decoding and printing the data sensed by said pins.

2. In a record controlled machine having record sensing means including row forming columns of yieldably urged pins, plural latching means for holding different pins of each column in lowered position, means for cyclically moving each of said latching means to release the pins for simultaneously sensing all of the code perforations in a record; restoring bar means common to the pins of each row for retracting the pins in row by row order, each of said latching means being common to the pins of each column and operable by the retractile movement of pins that have sensed perforations in different rows of the record to provide a pulsing movement, and means controlled by the joint pulsing movement of said latching means for decoding and printing the data sensed by said pins.

3. In a record controlled machine having record sensing means including columns of yieldably urged pins arranged in horizontal rows for simultaneously sensing all of the code perforations in a record; means for retracting the pins in row by row order, pulsing means common to the pins of each column and operable by the retractile movement of pins that have sensed perforations in different rows, means controlled by said pulsing means for printing the data sensed by said pins, and means for transposing the action of said pulsing means to print the data in columns of a work sheet at variance with the location of columns of the record from which said data is sensed.

4. In a record controlled machine having record sensing means including row forming columns of yieldably urged pins for simultaneously sensing all of the code perforations in a record; means for retracting the pins in row by row order, a pair of pulsing means common to the pins of each column and operable by the retractile movement of pins that have sensed perforations in different rows, means controlled by said pulsing means for printing the data sensed by said pins, and means for transposing the action of the pulsing means of each pair to print the data in columns of a work sheet at variance with the location of columns of the record from which said data is sensed.

5. In a record controlled machine having record sensing means including row forming columns of yieldably urged sensing pins; latching slides for holding the pins in retracted position, means for moving said slides to release said pins for simultaneously sensing all of the code perforations in said record, means for retracting the pins in row by row order, said slides being moved by the retractile movement of pins that have sensed perforations in different rows, means for recording the data sensed, means for transmitting the movements of said slides to said recording means, and means for disabling said transmitting means when the slides are moved to release said pins for sensing action.

6. In a record controlled machine having record sensing means including row forming columns of yieldably urged sensing pins; a pair of latching slides for holding different pins of each column in retracted position and movable initially to release all of said pins for simultaneous sensing of all of the code perforations in a record, means for retracting the pins in row by row order, each slide of a pair being given a pulsing movement by the retraction of pins in different rows that have sensed perforation in the record, data recording means, means for transmitting the pulsing movements of each of the slides to said recording means; and means for disabling the transmitting means for transfer of the initial movement of the slides to said recording means.

7. In a record controlled machine having record sensing means including row forming columns of yieldably urged sensing pins; a pair of latching slides for holding different pins of each column in retracted position, means for moving the slides cyclically to release all of said pins for simultaneous sensing of all the code perforations in a record, means for selectively retracting rows of pins, means associated with the pins and the slides for giving the latter a pulsing movement by the retract movement of the pins in different rows, means controlled by said pulsing movement of the slides for recording the data sensed by the pins, and means for transposing the pulsing action of each of said pair of slides to said recording means to record the data in columns of a work sheet at variance with the location of columns of the record from which the data is sensed.

8. In a record controlled machine having sensing means including row forming columns of yieldably urged pins for sensing a plurality of data representing code perforations in each column of a record, a pair of latching slides for holding different pins of each column in retracted position and movable columnwise initially to release all of said pins for simultaneous sensing of all of the perforations in the record, a restoring bar extending lengthwise of each row of pins, means for actuating said bars selectively to retract rows of pins, each slide of a pair being given a pulsing movement columnwise by the retraction of pins in different rows that have sensed perforations in the record, data decoding printing means including movable dogs and racks movable differentially by said dogs to position type at a printing position, pulse transmitting means operated by the pulsing action of said slides for engaging the dogs with said racks at predetermined points in the movement of said dogs, and means for disabling said transmitting means when the slides are moved to release said pins for sensing action.

9. In a record controlled machine having sensing means including row forming columns of yieldably urged pins for sensing one or more data representing code perforations in each column of a record, a pair of latching slides for holding different pins of each column in retracted position and movable columnwise initially to release all of said pins for simultaneous sensing of all of the perforations in the record, a restoring bar extending lengthwise of each row of pins, means for actuating said bars selectively to retract rows of pins, one or both slides of a pair being given a pulsing movement columnwise by the retraction of pins in different rows that have sensed perforations in the record, data decoding printing means for recording the sensed data including adjustable rack means, traveling dog means for adjusting each rack means, means for projecting the dog means into contact with the rack means, and pulse movement transposing means operable by the pulsing action of both slides for releasing said dog projecting means to bring each dog means into engagement with said rack means during travel of said dog means for recording the data on a work sheet in a location at variance with the location of the data on the record sensed.

10. In a record controlled machine having sensing means including row forming columns of yieldably urged pins for sensing one or more data representing code perforations in each column of a record, a pair of latching slides common to the pins of each column, pulsing means in each slide for holding different pins of each column in retracted position means for moving said slides simultaneously to release all of said pins for simultaneous sensing of all of the perforations in the record, restoring bar means common to each row of pins retracting all of the pins in each row simultaneously and all of the rows sequentially, one or both slides of a pair being given a pulsing movement through said pulsing means by the retraction of pins in different rows that have sensed perforations in the record, and means controlled by the pulsing action of said slides for recording the sensed data.

11. In a record controlled machine having means for sensing data representing perforations in a record and pulse emitting means operated by said sensing means; a printing mechanism including type holders, means for differentially moving said holders to bring the type thereof to printing position, said means including for each holder spaced racks on one of which said holder is mounted, said racks having opposing teeth, a gear between the racks and in mesh with the teeth thereof, a carrier to which said gear is pivoted, travelling means for moving one of said racks, travelling means for moving the carrier, and means controlled by said pulse emitting means for selectively engaging each of said travelling means with its respective rack and carrier in synchronism with the operation of said pulsing means to position the type of a holder at the printing point.

12. In a record controlled machine, means for sensing records having single numeral group perforations and single alphabet group perforations, pulse emitting means operated by the means sensing the holes of the numeral group, pulse emitting means operated by the means sensing the holes of the alphabet group, a printing mechanism having holders each containing type arranged lineally in regular order including a numeral group and a plurality of alphabet groups, each alphabet group substantially coinciding in extent with said numeral group, a plurality of means for moving the holders to displace the numeral group with a selected alphabet group and to bring a sensed letter of the selected alphabet group to the printing point, and means controlled by said pulsing means for defining the holder moving action of each of said moving means.

13. In a record controlled machine, means for sensing records having numeral group designations and alphabet groups designations, pulse emitting means operated by the means sensing the designations of the numeral group, pulse emitting means operated by the means sensing the designations of the alphabet group, printing means including holders each having type arranged lineally in numeral and alphabet groups, each alphabet group coinciding in extent with the numeral group, means for moving the holders in alphabet group increments, means for moving the holders in single numeral increments, means controlled by the operation of the alphabet group pulse means for activating the group increment moving means, and means controlled by the operation of the numeral group pulse means for activating the numeral group moving means and said holder moving means operating synergetically to position a selected character of the alphabet group at the printing point.

14. In a printing mechanism in combination, a carrier for holding type in vertical alignment in numeral and alphabet order groups, a rack on which said carrier is mounted, an auxiliary rack spaced from said carrier rack, said racks having opposing teeth, an actuator, a gear pivoted to the actuator and meshing with the opposing teeth of said racks, ratchet teeth on said auxiliary rack, spaced projections on said actuator, movable dog means for engaging the projections on said actuator to move the type carrier to bring one of the alphabet order groups to the printing area, and movable dog means for engaging the ratchet teeth to move the type carrier an increment of the numeral group order and said auxiliary rack and actuator operating synergetically through said gear to position a selected type of the carrier at the printing point.

15. In a printing mechanism, in combination, a carrier for holding type in vertical alignment in numeral and alphabet order groups, a rack for said carrier, an auxiliary rack spaced from said carrier rack, said racks having opposing teeth, an actuator, a gear pivoted to the actuator and meshing with the opposing teeth of said racks, ratchet teeth on said auxiliary rack, spaced projections on said actuator, movable dog means for engaging the projections on said actuator to move the type carrier to bring one of the alphabet order groups to the printing area, a mesh plate for thrusting the movable dog means into engagement with said projections at a predetermined time, movable dog means for engaging the ratchet teeth on said auxiliary rack to move the type carrier one or more increments corresponding to the numeral order group, and a mesh plate for thrusting the last named dog means into engagement with the ratchet teeth of the auxiliary rack at a predetermined time, and said auxiliary rack and actuator through said gear operating synergetically to position a selected type of the carrier at the printing position.

16. In a record controlled machine having record sensing means including row forming columns of yieldably urged pins for simultaneously sensing all of the code perforations in a record; means for retracting the pins in row by row order, a plurality of pulsing means common to the pins of each column and operable by the retractile movement of pins that have sensed perforations in different rows, means controlled by the joint action of said plural pulsing means for decoding and printing the data sensed by said pins including a carrier for holding type in vertical alignment in numeral and alphabet order groups, a rack on which said carrier is mounted, an auxiliary rack spaced from said carrier rack, said racks having opposing teeth, an actuator, a gear pivoted to the actuator and meshing with the opposing teeth of said racks, ratchet teeth on said auxiliary rack, spaced projections on said actuator, traveling dog means for engaging the projections on said actuator to move the type carrier to bring one of the alphabet groups to the printing area, and traveling dog means for engaging the ratchet teeth to move the type carrier an increment of the numeral group, said auxiliary rack and actuator operating synergetically through said gear to position at the printing point the type representing the coded character that has been sensed in said record.

17. In a record controlled machine having record sensing means including row forming columns of yieldably urged sensing pins; a pair of latching slides for holding different pins of each column in retracted position, means for moving the slides cyclically to release all of said pins for simultaneous sensing of all of the data code perforations in a record, means for selectively retracting rows of pins, means associated with the pins and the slides for giving the latter a pulsing movement by the retract movement of the pins in different rows, means controlled by said pulsing movement of the slides for decoding and printing the data sensed by the pins including a carrier for holding type in vertical alignment in numeral and alphabet order groups, a rack for the carrier, an auxiliary rack spaced from said carrier rack, said racks having opposing teeth, an actuator, a gear pivoted to the actuator and meshing with the opposing teeth of said racks, ratchet teeth on said auxiliary rack, spaced projections on said actuator, traveling dog means for engaging the projections on said actuator to move the type carrier to bring one of the alphabet groups to the printing area, traveling dog means for engaging the ratchet teeth to move the type carrier an increment of the numeral group order, pulse operated means for engaging each of said traveling dog means with its respective actuator and rack to operate the actuator and rack synergetically through said gear to position a selected type of the carrier at the printing point, and means for transposing the pulsing action of each of said pair of slides to said traveling dog engaging means to record the data in columns of a work sheet at variance with the location of columns of the record from which the data is sensed.

18. In a record controlled machine having record sensing means including row forming columns of pins for simultaneously sensing all of the data perforations in a record; means for retracting the pins in row by row order, pulsing means common to the pins of each column and operable by the retract movement of pins that have sensed perforations in different rows of the record, means controlled by said pulsing means for decoding and printing the data sensed by said pins including a type carrier, means for moving the carrier to bring a selected type to the printing point including traveling dogs, toothed racks along which said dogs move, means for selectively projecting the dogs into engagement with the racks to move the carrier at different speeds, and means operable by said pulsing means for controlling the operation of said dog projecting means.

19. In a record controlled machine having sensing means including row forming columns of yieldably urged pins for sensing a plurality of data representing code perforations in each column of a record, a pair of upper and lower latching slide pulse means for holding different pins of each column in retracted position and movable initially to release all of said pins for simultaneous sensing of all the perforations in the record, means for selectively retracting rows of pins, each slide of a pair being given a pulsing movement by the retraction of certain pins in the same row that have sensed perforations in the record, upper and lower group means corresponding with said upper and lower slide pulse means for transposing the action of said pulse means whereby said data may be recorded on a work sheet in locations at variance with the locations of the data on the record sensed, each upper and lower transposing group means including spaced upper and lower sets of pulse conducting members, transfer pins selectively mounted between the upper and lower sets of each group of pulse conducting members for transferring pulse movements therebetween, means for decoding and printing the data sensed including movable rack members, means for moving said rack members differentially, and means independently controlled by the action of said pulse conducting members for selectively engaging said rack moving means with said rack members.

References Cited in the file of this patent

UNITED STATES PATENTS

| | | |
|---|---|---|
| 1,882,766 | Bryce | Oct. 18, 1932 |
| 1,926,891 | Bryce | Sept. 12, 1933 |
| 2,044,121 | Lasker | June 16, 1936 |
| 2,311,471 | Ritzert | Feb. 16, 1943 |
| 2,323,816 | Lasker | July 6, 1943 |
| 2,421,078 | Mueller | May 27, 1947 |
| 2,516,013 | Mixer | July 18, 1950 |
| 2,577,070 | Cheney | Dec. 4, 1951 |
| 2,589,987 | Braun | Mar. 18, 1952 |
| 2,596,721 | Pentecost | May 13, 1952 |
| 2,616,364 | Crowell | Nov. 4, 1952 |
| 2,623,693 | Holden | Dec. 30, 1952 |
| 2,764,410 | Kase | Sept. 25, 1956 |